US006901682B2

(12) United States Patent
Igaki et al.

(10) Patent No.: US 6,901,682 B2
(45) Date of Patent: Jun. 7, 2005

(54) ROTATION ANGLE DETECTING APPARATUS AND ITS ROTARY DISC

(75) Inventors: Masahiko Igaki, Kanagawa (JP); Yasushi Miura, Kanagawa (JP); Manabu Takayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/147,130

(22) Filed: May 15, 2002

(65) Prior Publication Data

US 2002/0196833 A1 Dec. 26, 2002

(30) Foreign Application Priority Data

May 17, 2001 (JP) ........................................ 2001-147559

(51) Int. Cl.[7] .............................................. G01D 21/00
(52) U.S. Cl. ............................ 33/702; 33/1 PT; 33/706
(58) Field of Search .......................... 33/702, 706, 707, 33/708, 1 PT, DIG. 11, DIG. 19; 374/55

(56) References Cited

U.S. PATENT DOCUMENTS

| | | | | |
|---|---|---|---|---|
| 2,930,895 A | * | 3/1960 | Christoph | 356/150 |
| 3,041,599 A | * | 6/1962 | Beaudette | 341/9 |
| 3,775,655 A | * | 11/1973 | Du Vall | 318/634 |
| 3,816,002 A | * | 6/1974 | Wieg | 356/395 |
| 4,100,837 A | * | 7/1978 | Kohler | 409/238 |
| 4,466,190 A | * | 8/1984 | Ross et al. | 33/1 M |
| 4,738,030 A | * | 4/1988 | Backlund et al. | 33/702 |
| 4,815,213 A | * | 3/1989 | McCabe et al. | 33/702 |
| 4,831,737 A | * | 5/1989 | Grund | 33/702 |
| 5,065,525 A | * | 11/1991 | Szenger | 33/702 |
| 5,152,066 A | * | 10/1992 | Rieder et al. | 33/1 PT |
| 5,650,852 A | * | 7/1997 | Chastain et al. | 356/630 |
| 6,167,634 B1 | * | 1/2001 | Pahk et al. | 33/702 |
| 6,246,232 B1 | * | 6/2001 | Okumura | 324/207.2 |
| 6,298,566 B1 | * | 10/2001 | Endo et al. | 33/1 PT |
| 6,449,853 B1 | * | 9/2002 | Brueggemann | 33/1 PT |
| 6,456,896 B1 | * | 9/2002 | Ito et al. | 700/193 |
| 6,532,680 B2 | * | 3/2003 | Braasch et al. | 33/702 |
| 6,574,876 B2 | * | 6/2003 | Takeuchi | 33/1 PT |
| 6,577,984 B1 | * | 6/2003 | Clairet et al. | 702/151 |

FOREIGN PATENT DOCUMENTS

| | | | | |
|---|---|---|---|---|
| JP | 60-140119 | | 7/1985 | |
| JP | 62-3617 | | 1/1987 | |
| JP | 4-130221 | | 1/1992 | |
| JP | 5-39410 | | 6/1993 | |
| JP | 5-39411 | | 6/1993 | |
| JP | 5-240613 | | 9/1993 | |
| JP | 5-84818 | | 11/1993 | |
| JP | 2000320688 A | * | 11/2000 | ............ F16J/15/32 |

* cited by examiner

*Primary Examiner*—Diego Gutierrez
*Assistant Examiner*—Mirellys Jagan
(74) *Attorney, Agent, or Firm*—Morgan & Finnegan LLP

(57) ABSTRACT

A rotary disc made of synthetic resin has a fixed portion fixed to a rotary shaft, a cylindrical portion extending in the thrust direction from the outer peripheral edge of the fixed portion, and a disc main body portion extending in the radial direction from the lower portion of the cylindrical portion, and a scale portion for detecting the rotation angle is disposed on the underside of the disc main body portion. Among the coefficient of thermal expansion $\alpha 1$ of the rotary disc, the coefficient of thermal expansion $\alpha 2$ of the rotary shaft, the temperature characteristic factor $\beta$ of a sensor head, the distance H between a mounting reference surface and the light condensing point of the sensor head in the thrust direction, the distance L from the fixed point of the rotary shaft and a bearing to the fixed point of the rotary shaft and the rotary disc in the thrust direction, the distance S between the fixed point and the scale portion for rotation angle detection in the thrust direction, and the amount of change $\Delta T$ of temperature, a relational expression $\beta \times H \times \Delta T = (\alpha 2 \times L + \alpha 1 \times S) \times \Delta T$ and a relational expression $L = H + S$ are established to thereby construct a rotation angle detecting apparatus which is hardly affected by any temperature change.

10 Claims, 9 Drawing Sheets

ROTATION ANGLE DETECTING APPARATUS AND ITS ROTARY DISC

BACKGROUND OF THE INVENTION

1. Field of the Invention

This invention relates to the rotation angle detecting apparatus of a rotary encoder or the like provided with a rotary disc made chiefly of synthetic resin and the rotary disc thereof.

2. Description of Related Art

Many of conventional rotary encoders are of the optical type which optically detects rotation angle information or the magnetic type which magnetically detects rotation angle information. The rotary encoders of the optical type are of the transmitting type which transmits a beam therethrough to a scale portion for detecting a rotation angle, or the reflecting type which reflects a beam by a scale portion for detecting a rotation angle.

For example, FIG. 11 of the accompanying drawings shows a conventional rotary encoder of the transmitting type, and the motor 1 of this rotary encoder supports a rotary shaft 2 by bearings 3 and 4. A mounting hub 5 is fitted to the upper portion of the rotary shaft 2, and this mounting hub 5 is fixed to the rotary shaft 2 by a set screw 6. A rotary scale 7 which is a rotation angle information recording member is carried on the upper surface of the mounting hub 5, and the rotary scale 7 is fixed to the mounting hub 5 by a snap ring 8 fixed to the rotary shaft 2 and an adhesive agent 9. A transmitting type sensor head 11 is disposed on the upper surface of the motor 1 with an electric circuit substrate 10 interposed therebetween.

The sensor head 11 is provided with a frame 12 on the electric circuit substrate 10, and the marginal edge portion of the rotary scale 7 is disposed between the upper frame portion 12a and lower frame portion 12b of the frame 12 so as not to contact therewith. The upper frame portion 12a of the frame 12 contains therein a light emitting element 13 and a collimator lens 14 in succession from above, and the lower frame portion 12b contains therein a fixed scale 15 and a light receiving element 16 in succession from above.

The mounting hub 5 is formed of a material such as brass or aluminum excellent in machinability, and the inner diameter of a fitting hole 5a for fitting the rotary shaft 2 therein and a receiving surface 5b for carrying the rotary scale 7 thereon are machined highly accurately. The rotary scale 7 comprises a thin glass plate or a thin metal plate formed with a slit by the etching process or PET film for photoengraving.

When assembling this rotary encoder, the mounting hub 5 is fitted to the rotary shaft 2 of the motor 1, and the mounting hub 5 is positioned at a predetermined thrust level and the set screw 6 is fastened. Next, the rotary scale 7 is carried on the upper surface of the mounting hub 5, and is tentatively fixed by the snap ring 8 fixed to the rotary shaft 2. Then, the centering adjustment of the center of the recording pattern of a scale portion 7a for detecting the rotation angle of the rotary scale 7 and the center of the rotary shaft 2 is effected. Thereafter, as shown in FIG. 12 of the accompanying drawings, the rotary shaft 2 and the snap ring 8 are fixed to each other by the adhesive agent 9 and also, the rotary scale 7 and the snap ring 8 are fixed to each other by the adhesive agent 9. Lastly, the sensor head 11 is brought close to the rotary scale 7 so that the outer peripheral portion of the rotary scale 7 may be inserted between the upper frame portion 12a and the lower frame portion 12b, and is fixed to an appropriate location on the motor 1.

A divergent beam emitted from the light emitting element 13 of the sensor head 11 is transmitted through the collimator lens 14 and becomes a substantially parallel beam, and passes through the scale portion 7a for detecting the rotation angle of the rotary scale 7 and passes through the fixed scale 15 and is incident on the light receiving element 16. At this time, the sensor head 11 optically reads a change in moire fringe created with a change in the relative angular position of the scale portion 7a for detecting the rotation angle and the fixed scale 15 as a change in the quantity of light incident on the light receiving element 16, and detects the rotation angle of the rotary scale 7.

FIG. 13 of the accompanying drawings shows a conventional rotary encoder of the reflecting type, and instead of the above-described sensor head 11, a sensor head 17 for detecting the reflected beam from a scale portion 7a for detecting the rotation angle of a rotary scale 7.

To manufacture the conventional rotary encoder like this, the mounting hub 5, the set screw 6, the snap ring 8, the adhesive agent 9, etc. become necessary, and the number of portions to which the adhesive agent 9 is applied is great and further, the centering adjustment also becomes necessary, and the number of steps is great and the curtailment of manufacturing cost is difficult. Also, since the rotary scale 7 comprises a thin glass plate or a thin metal plate formed with a slit by the etching process or PET film for photoengraving, it is difficult to achieve high coaxiality accuracy and fitting accuracy.

In recent years, in the manufacture of a rotary encoder, there is known a method of curtailing manufacturing cost by integrally molding the mounting hub 5 and the rotary scale 7 from a synthetic resin material, and easily incorporating then as a rotary disc onto the rotary shaft 2. For example, the applicant discloses a rotary scale using a V-groove grating in Japanese Patent Application Laid-Open No. 60-140119, Japanese Patent Application Laid-Open No. 62-3617, Japanese Utility Model Application Laid-Open No. 5-84818, Japanese Patent Publication No. 5-39410, Japanese Patent Publication No. 5-39411, etc., and has proposed a cylinder grating type rotary scale in Japanese Patent No. 2810521, Japanese Patent No. 2862417, etc.

FIG. 14 of the accompanying drawings shows a rotary encoder provided with a rotary disc 18 integrally molded from a synthetic resin material, and this rotary disc 18 has a scale portion 18a for detecting the rotation angle thereof. The rotary disc 18 is fitted to the rotary shaft 2 of a motor 1 similar to that described above, and the rotary shaft 2 and the rotary disc 18 are secured to each other by an adhesive agent 19.

This rotary encoder does not require the mounting hub 5, the set screw 6, the snap ring 8, etc. described above. Also, the fitting accuracy of the fitting hole 18b of the rotary disc 18 to the rotary shaft 2 and the coaxiality accuracy of the pattern of the scale portion 18a for detecting the rotation angle and the fitting hole 18b of the rotary disc 18 are achieved easily. Further, the most cumbersome step of centering described above is not required. Accordingly, the number of parts is reduced and moreover, the step of centering adjustment is made unnecessary and the manufacturing cost is greatly curtailed. However, the coefficient of thermal expansion of the synthetic resin material is greater than the coefficient of thermal expansion of glass or metals and therefore, if the rotary shaft 2 is made of a metal and the rotary disc 18 is made of synthetic resin, when the environmental temperature changes greatly, the dimensions of the rotary shaft 2 and the rotary disc 18 will change in accordance with their respective coefficients of thermal expansion, and the relative position between the rotary shaft 2 and the rotary disc 18 will change. Likewise, if the sensor head 11 is formed of a synthetic resin material, the sensor head may sometimes deviate from its appropriate position in accordance with its inherent temperature characteristic factor.

Particularly, when the dimensions of the rotary disc 18 and the sensor head 11 change with respect to the thrust direction of the rotary shaft 2, the optimum spacing between the scale portion 18a for detecting the rotation angle and the sensor head 11 will change, and the output signal of the sensor head 11 will change and the detection accuracy of the sensor head 11 will be deteriorated. Also, in the worst case, the rotary disc 18 and the sensor head 11 may mechanically contact with each other to thereby cause a hindrance.

However, to solve these problems, it becomes necessary to make the mounting telerance with respect to the thrust direction when mounting the rotary disc 18 and the sensor head 11 as small as possible, and this will cause the rise of the manufacturing cost.

SUMMARY OF THE INVENTION

It is an object of the present invention to solve the above-noted problems and to provide a rotation angle detecting apparatus which can cope with any change in the environmental temperature by an inexpensive construction and can detect a rotation angle highly accurately, and its rotary disc.

The rotation angle detecting apparatus according to the present invention for achieving the above object is a rotation angle detecting apparatus comprising rotary elements such as a motor, a gear and a pulley, a rotary disc made of synthetic resin and fixed to the rotary shaft of the rotary elements, and a sensor head for detecting information from a scale portion for detecting the rotation angle provided on the rotary disc, characterized in that the relative position of the scale portion for detecting the rotation angle and the sensor head is determined on the basis of the coefficients of thermal expansion of the rotary disc and the rotary shaft, and the temperature characteristic factor of the sensor head.

The rotary disc of the rotation angle detecting apparatus according to the present invention is formed of a synthetic resin material and is characterized by a fixed portion fixed to the rotary shaft of the motor of the rotation angle detecting apparatus, a cylindrical portion extending from the outer peripheral edge of the fixed portion in a direction along the axis of the rotary shaft, and a disc main body portion extending from the end portion of the cylindrical portion in a direction orthogonal to the axis of the rotary shaft.

Further, objects and construction of the present invention will become apparent from the description of some embodiments of the invention which will be described later.

DESCRIPTION OF THE PREFERRED EMBODIMENTS

Figure 1:
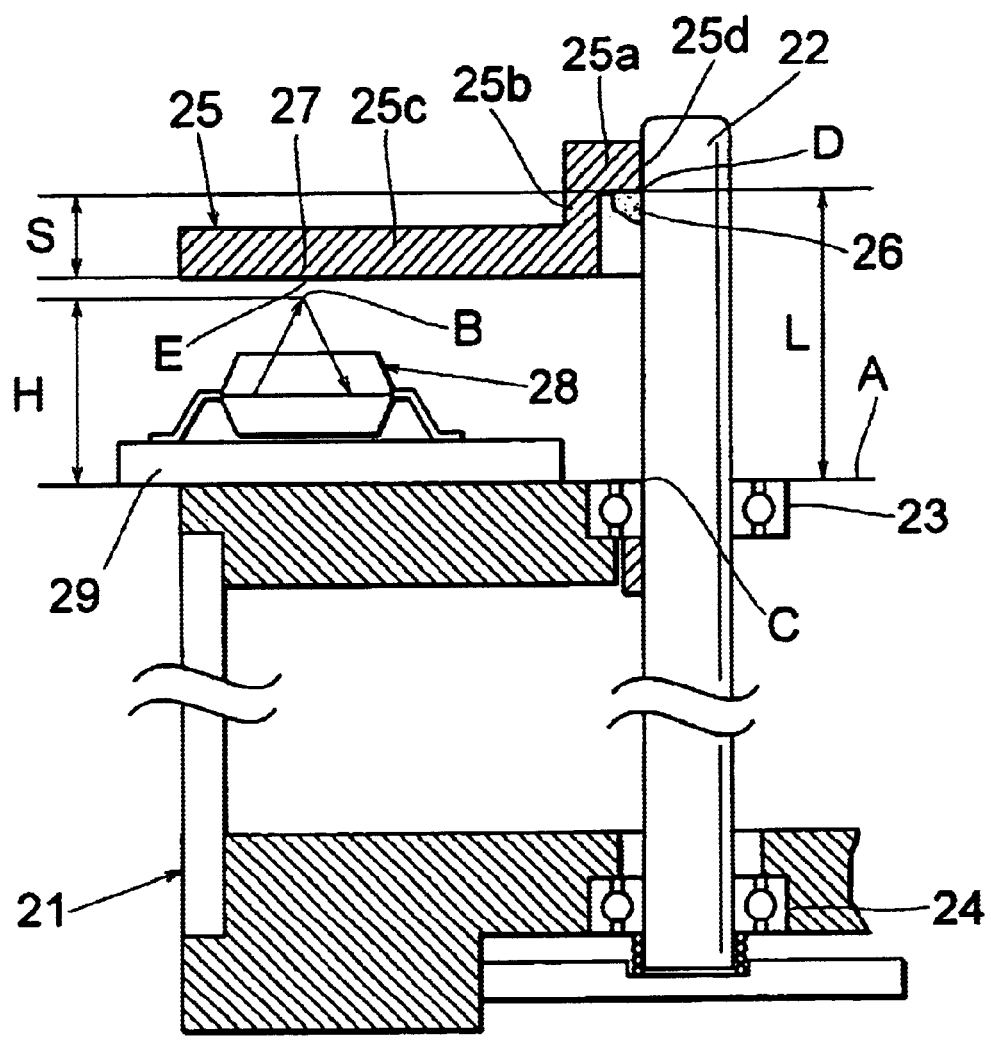
FIG. 1 is a cross-sectional view of the essential portions of a first embodiment.

The present invention will hereinafter be described in detail with respect to some embodiments thereof shown in FIGS. 1 to 10. FIG. 1 is a cross-sectional view of the essential portions of a first embodiment, and the rotation angle detecting apparatus of this first embodiment is a reflecting type rotary encoder. In a motor 21, a rotary shaft 22 is rotatably supported through an upper bearing 23 and a lower bearing 24. A rotary disc 25 is fitted to the upper portion of the rotary shaft 22, and the rotary disc 25 is secured to the rotary shaft 22 by an adhesive agent 26. A scale portion 27 for detecting the rotation angle is provided on the underside of the rotary disc 25, and one or more reflecting elements, not shown, are circumferentially regularly arranged on the scale portion 27 for detecting the rotation angle. A reflecting type sensor head 28 is mounted on the mounting reference surface A of the motor 21 with an electric circuit substrate 29 interposed therebetween.

The rotary disc 25 is integrally molded from a light-transmissive synthetic resin material. The rotary disc 25 is provided with a disc-shaped fixed portion 25a fixed to the rotary shaft 22, a cylindrical portion 25b extending downwardly from the outer peripheral edge of the fixed portion 25a in a direction along the axis of the rotary shaft 22, i.e., the thrust direction, and a disc main body portion 25c extending outwardly from the lower portion of the cylindrical portion 25b in a direction orthogonal to the rotary shaft 22, i.e., the radial direction. The fixed portion 25a is formed with a fitting hole 25d in which the rotary shaft 22 is fitted, and the scale portion 27 for detecting the rotation angle is provided on the underside of the disc main body portion 25c.

The light condensing point of the sensor head 28 is B, the fixing point of the rotary shaft 22 and the inner race of the upper bearing 23 in the mounting reference surface A of the motor 21 is C, the fixing point of the rotary shaft 22 and the rotary disc 25 is D, the element existing point at which the reflecting element or elements in the scale portion 27 for detecting the rotation angle exist is E, the distance between the fixing point C and the fixing point D with respect to the thrust direction of the rotary shaft 22 is L, the distance between the mounting reference surface A and the light condensing point B with respect to the thrust direction of the rotary shaft 22 is H, and the distance between the fixing point D and the element existing point E with respect to the thrust direction of the rotary shaft 22 is S.

Figure 2:
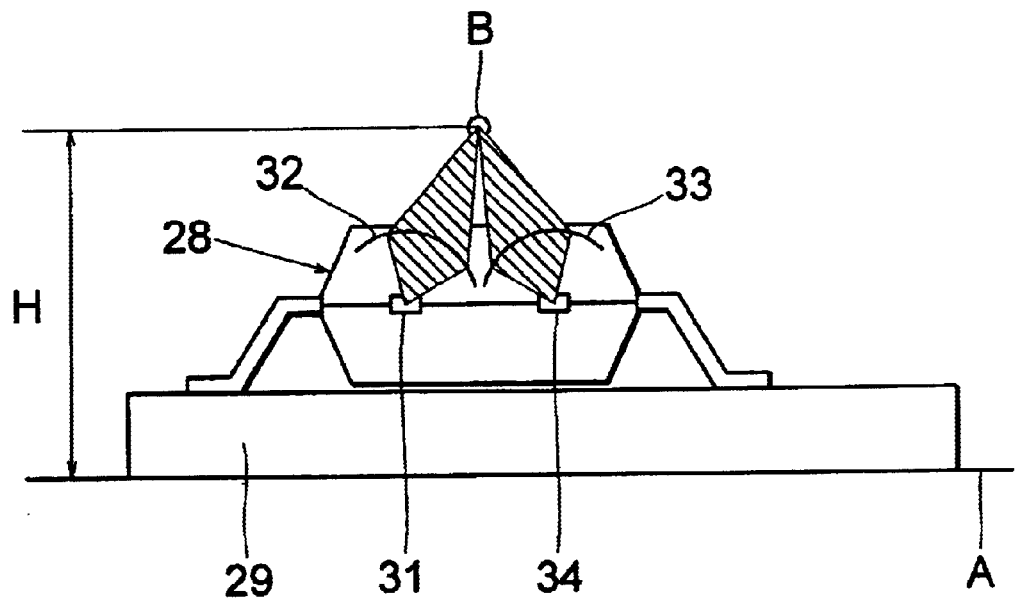
FIG. 2 is a detailed view of a sensor head.

As shown in FIG. 2, the sensor head 28 is comprised of a light emitting element 31 such as an LED emitting a beam, a first collimator lens 32 for condensing the beam from the light emitting element 31 at the light condensing point B, a second collimator lens 33 for condensing a divergent beam reflected by the scale portion 27 for detecting the rotation angle, and a light receiving element 34 for detecting the beam from the second collimator lens 33.

In this rotary encoder, the beam emitted from the light emitting element 31 is transmitted through the first collimator lens 32, and becomes a convergent beam and is condensed at the light condensing point B. This beam converged at the light condensing point B is reflected at the element existing point E of the scale portion 27 for detecting the rotation angle located at the light condensing point B, and becomes a divergent beam and is transmitted through the second collimator lens 33, and again becomes a convergent beam end enters the light receiving element 34. In this case, in the portions except the element existing point E of the scale portion 27 for detecting the rotation angle, the beam is transmitted through the rotary disc 25. With the rotation of the rotary disc 25, the reflecting element or elements of the scale portion 27 for detecting the rotation angle move circumferentially, and an electrical signal outputted from the light receiving element 34 changes and rotation angle information is obtained.

When the positions of the light condensing point B and the element existing point E coincide with each other, the sensor head 28 outputs a good electrical signal. However, the environmental temperature rises due to heat produced from the motor 21 and therefore, the rotary shaft 22, the rotary disc 25, the sensor head 28, etc. are thermally expanded to thereby tend to change the positions of the light condensing point B and the element existing point E. So, in this first embodiment, the following relational expressions (1) and (2) are established to thereby prevent any change in the positions of the light condensing point B and the element existing point E.

$$\beta \times H \times \Delta T = (\alpha 2 \times L + \alpha 1 \times S) \times \Delta T \quad (1)$$

$$L = S + H \quad (2)$$

where $\alpha 1$ is the coefficient of thermal expansion of the rotary disc 25, $\alpha 2$ is the coefficient of thermal expansion of the rotary shaft 22, $\beta$ is the temperature characteristic factor at the optimum position of the sensor head 28, and $\Delta T$ is the amount of change of the temperature. Also, as regards positive or negative of the distances H and L, above the mounting reference surface A is +, and as regards the sign of the distance S, above the fixing point D is +. Further, the temperature changes of the rotary shaft 22, the rotary disc 25, the sensor head 28, etc. are equal to one another.

The amount of change of the distance H changing in conformity with the amount of change $\Delta T$ of the temperature is defined as $\Delta H$, and the temperature characteristic factor $\beta$ is defined as $\beta = \Delta H/H$. That is, the temperature characteristic factor $\beta$ is a factor quantitatively representing at what rate the distance H is changed by the change in the temperature.

Figure 3:
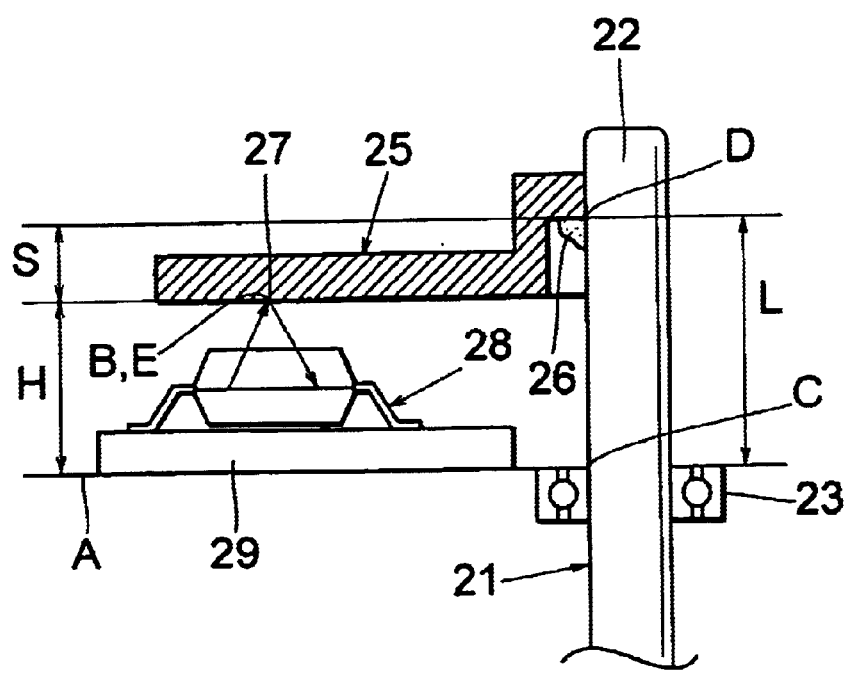
FIG. 3 is an illustration of a state in which a condensing point and an element existing point coincident with each other.

FIG. 3 shows a state in which the environmental temperature is the normal temperature 20° C. and the light condensing point B and the element existing point E are coincident with each other, namely, a state in which the rotary disc 25 is fixed to the rotary shaft 22 in an optimum positional relationship. When manufacturing the rotary encoder, the coefficients of thermal expansion $\alpha 1$ and $\alpha 2$ and the temperature characteristic factor $\beta$ are known, and as a result of the sensor head 28 having been mounted, the position of the light condensing point B, i.e., the distance H, can also be determined before and therefore, by substituting the values of the coefficients of thermal expansion $\alpha 1$ and $\alpha 2$, the temperature characteristic factor $\beta$ and the distance H for relational expression (1), and solving the simultaneous equations thereof with relational expression (2), the distances L and S are determined. Then, from these distances L and S, the shapes and fixed positions of the rotary shaft 22, the rotary disc 25, the sensor head 28, etc. are found.

Figure 4:
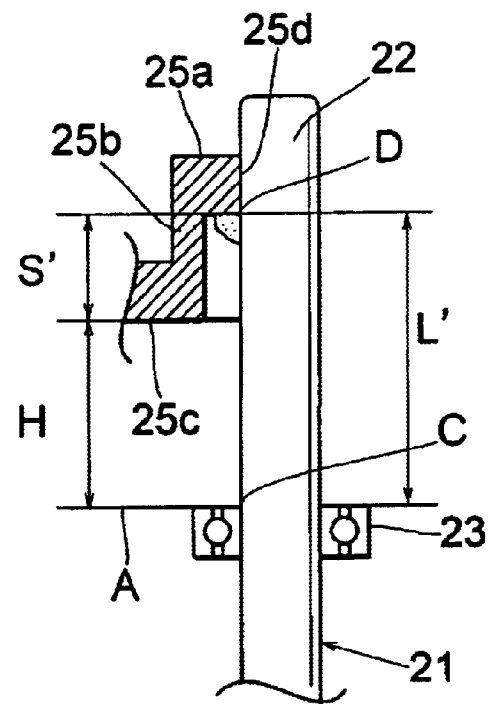
FIG. 4 is an illustration of the action in the state after temperature has risen.

FIG. 4 is an illustration of the action, and shows a case where the environmental temperature has greatly changed with the temperature characteristic factor $\beta$ being $\beta = 0$. The rotary shaft 22 is made of stainless steel, and the rotary disc 25 is made of polycarbonate. Accordingly, the coefficient of thermal expansion $\alpha 1 \cong 6.6 \times 10^{-5}$, and the coefficient of thermal expansion $\alpha 2 \cong 1.47 \times 10^{-5}$. At this time, assuming that the distance H is 7.7 mm, from relational expressions (1) and (2), the distance L is +9.9 mm and the distance S is −2.2 mm.

In this case, the temperature characteristic factor $\beta = 0$ and therefore, the sensor head 28 is not affected by the temperature and the position of the light condensing point B does not change. However, the environmental temperature rises greatly and therefore, the rotary shaft 22 and the rotary disc 25 are thermally expanded in accordance with their inherent coefficients of thermal expansion $\alpha 1$ and $\alpha 2$. When the rotary shaft 22 is thermally expanded, the fixing point D moves upwardly and assumes a distance L' greater than the above-described distance L. Also, the rotary disc 25 is downwardly expanded with the fixing point D as the reference, and assumes a distance S' greater than the above-described distance S. At this time, the cylindrical portion 25b of the rotary disc 25 is expanded chiefly downwardly and offsets the movement of the element existing point E in the thrust direction resulting from the expansion of the rotary shaft 22.

Accordingly, in this first embodiment, even if the environmental temperature rises greatly, both of the light condensing point B and the element existing point E become immovable points, and it becomes possible to output a stable signal.

Figure 5:
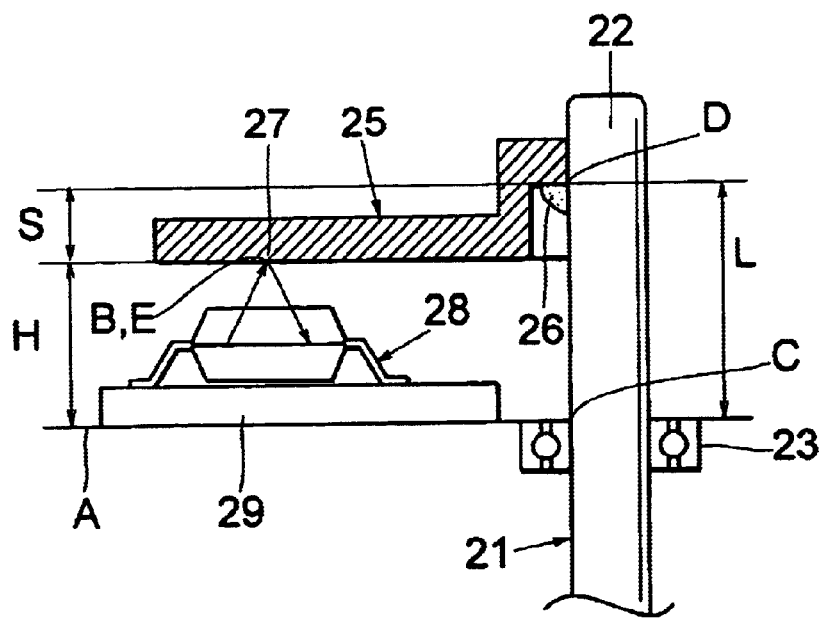
FIG. 5 is a cross-sectional view of the essential portions of a second embodiment.
Figure 6:
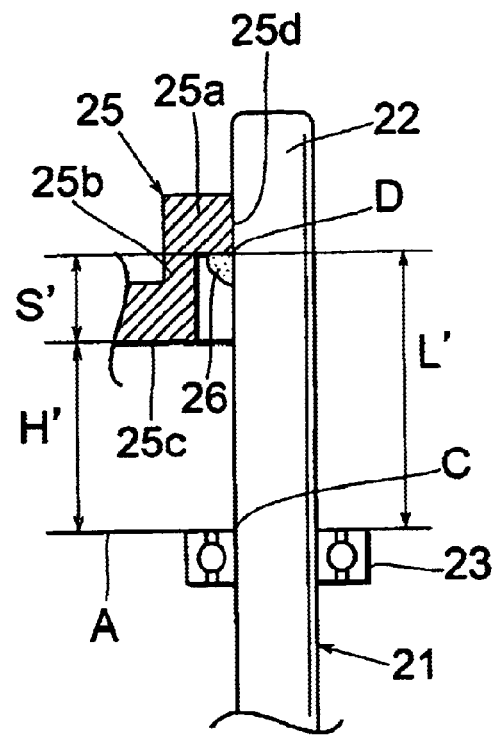
FIG. 6 is an illustration of the action in the state after temperature has risen.

FIG. 5 is a cross-sectional view of the essential portions of a second embodiment, and FIG. 6 is an illustration of the action thereof, and the temperature characteristic factor $\beta = 0.50 \times 10^{-5}$ and the other conditions are similar to those described above. In this second embodiment, the distance L is +9.15 mm and the distance S is −1.45 mm, and an effect similar to that of the first embodiment is obtained.

Figure 7:
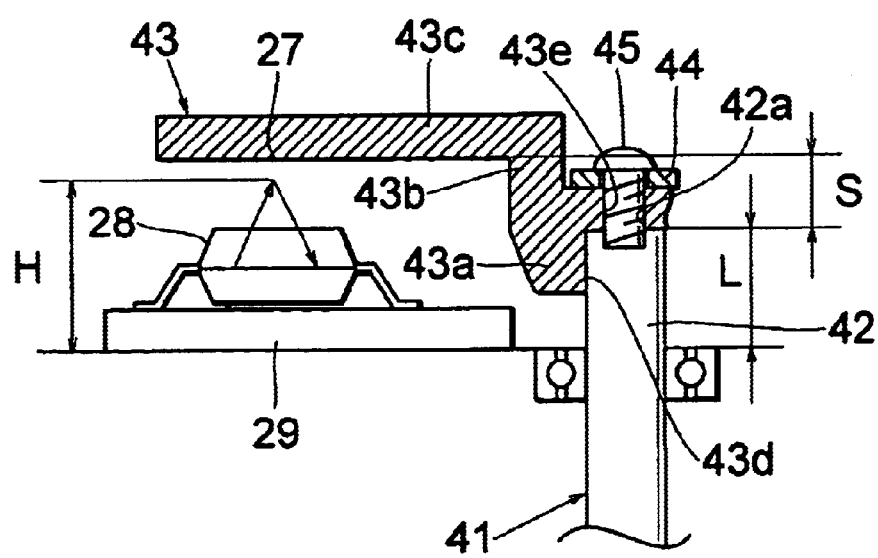
FIG. 7 is a cross-sectional view of the essential portions of a third embodiment.

FIG. 7 is a cross-sectional view of the essential portions of a third embodiment, and shows a case where the temperature characteristic factor $\beta$ is great. A rotary disc 43 is fixed to the upper end surface of the rotary shaft 42 of a motor 41 by a washer 44 and a set screw 45. The upper end surface of the rotary shaft 42 is formed of a threaded hole 42a threadably engaged by the set screw 45.

The rotary disc 43 is provided with a fixed portion 43a fixed to the rotary shaft 42, a cylindrical portion 43b extending upwardly from the outer peripheral edge of the fixed portion 43a, and a disc main body portion 43c extending horizontally outwardly from the upper portion of the cylindrical portion 43b. The fixed portion 43a is formed with a fitting hole 43d in which the rotary shaft 42 is fitted, and an insertion hole 43e in which the set screw 45 is inserted, and the scale portion 27 for detecting the rotation angle is disposed on the underside of the disc main portion 43c.

When in this third embodiment, the temperature characteristic factor $\beta = 2.60 \times 10^{-5}$ and the other conditions are made similar to those in the first embodiment, the distance L becomes +6.0 mm and the distance S becomes +1.7 mm, and an effect similar to that of the first and second embodiment is obtained.

Figure 8:
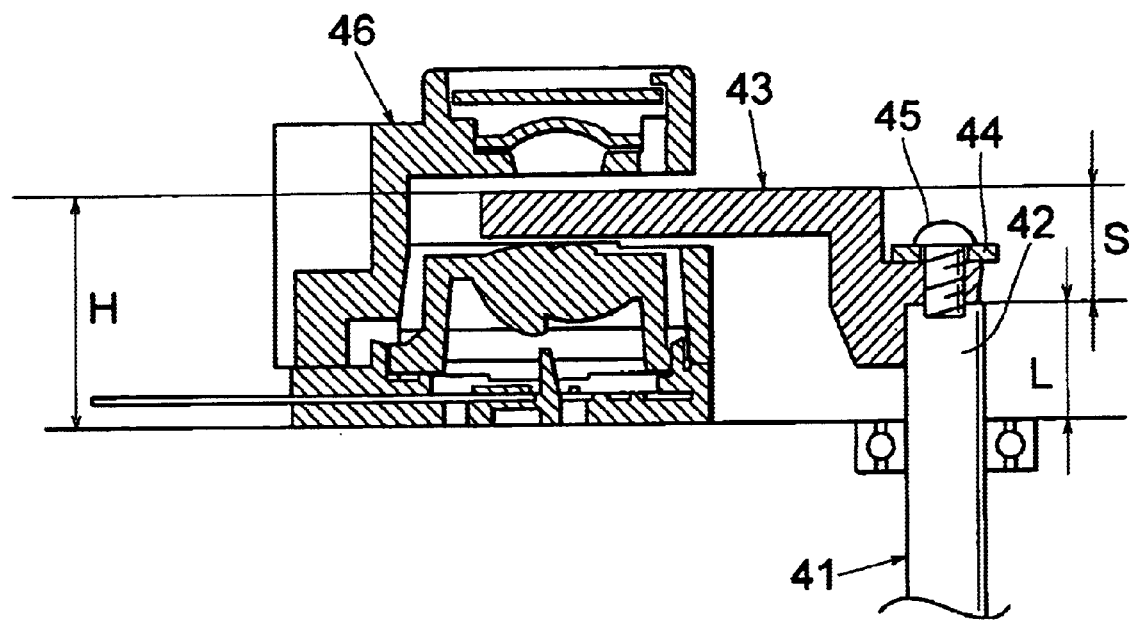
FIG. 8 is a cross-sectional view of the essential portions of a fourth embodiment.

FIG. 8 is a cross-sectional view of the essential portions of a fourth embodiment, and a transmitting type sensor head 46 is used instead of the sensor head 28 in the third embodiment. Again in this fourth embodiment, an effect similar to that of the first and second embodiments is obtained.

Figure 9:
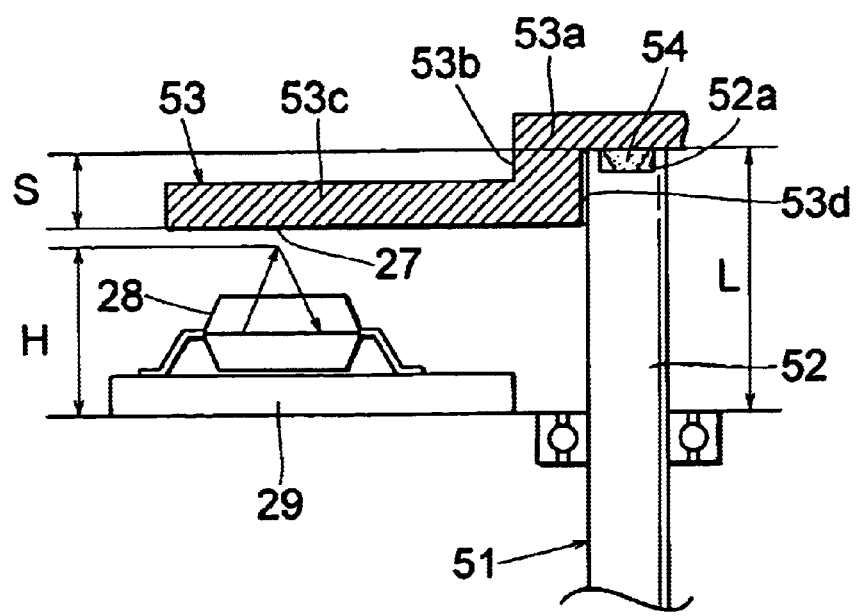
FIG. 9 is a cross-sectional view of the essential portions of a fifth embodiment.

FIG. 9 is a cross-sectional view of the essential portions of a fifth embodiment, and a rotary disc 53 is fixed to the upper end surface of the rotary shaft 52 of a motor 51 by an adhesive agent 54. The upper end surface of the rotary shaft 52 is formed with a groove portion 52a to which the adhesive agent 54 is applied.

The rotary disc 53 is provided with a fixed portion 53a disposed on the upper end surface of the rotary shaft 52, a cylindrical portion 53b extending downwardly from the outer peripheral edge of the fixed portion 53a, and a disc main body portion 53c extending horizontally outwardly from the lower portion of the cylindrical portion 53b. The interior of the cylindrical portion 53b is made into a fitting hole 53d in which the rotary shaft 52 is fitted, and the space between the outer peripheral surface of the rotary shaft 52 and the inner peripheral surface of the fitting hole 53d is a minute gap, and the scale portion 27 for detecting the rotation angle is disposed on the underside of the disc main body portion 53c. Again in this fifth embodiment, an effect similar to that of the first to third embodiments is obtained.

Figure 10:
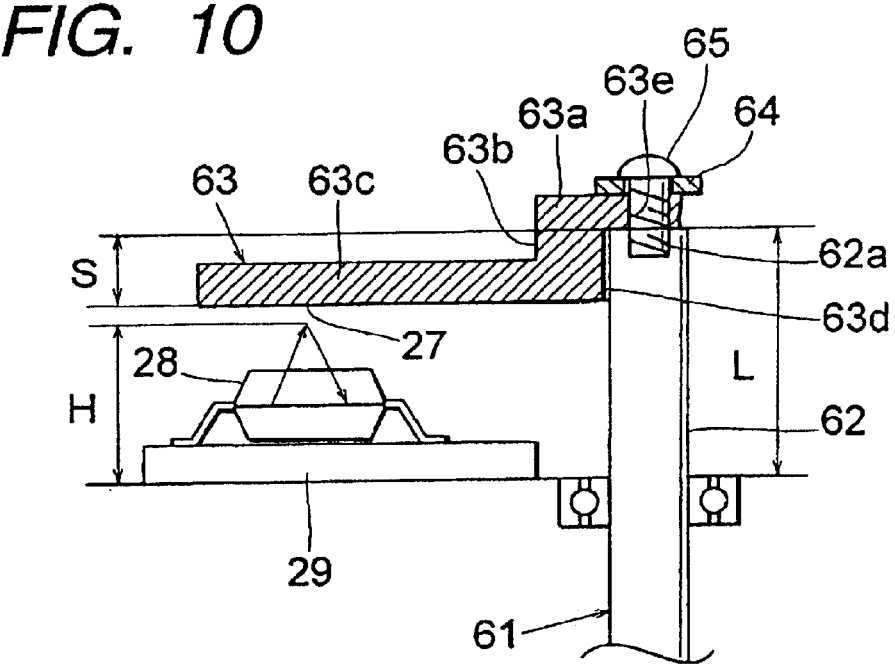
FIG. 10 is a cross-sectional view of the essential portions of a sixth embodiment.
Figure 11:
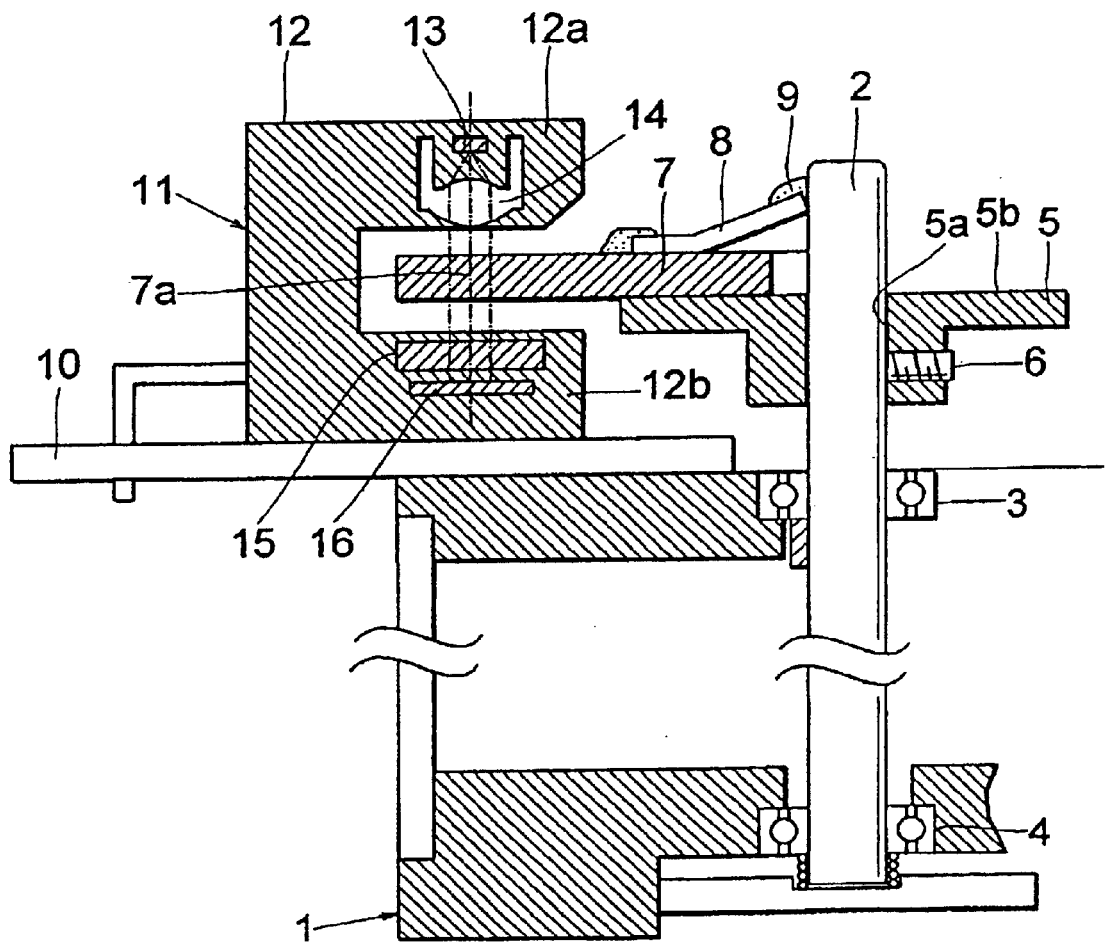
FIG. 11 is a fragmentary cross-sectional view of a transmitting type encoder according to the prior art.
Figure 12:
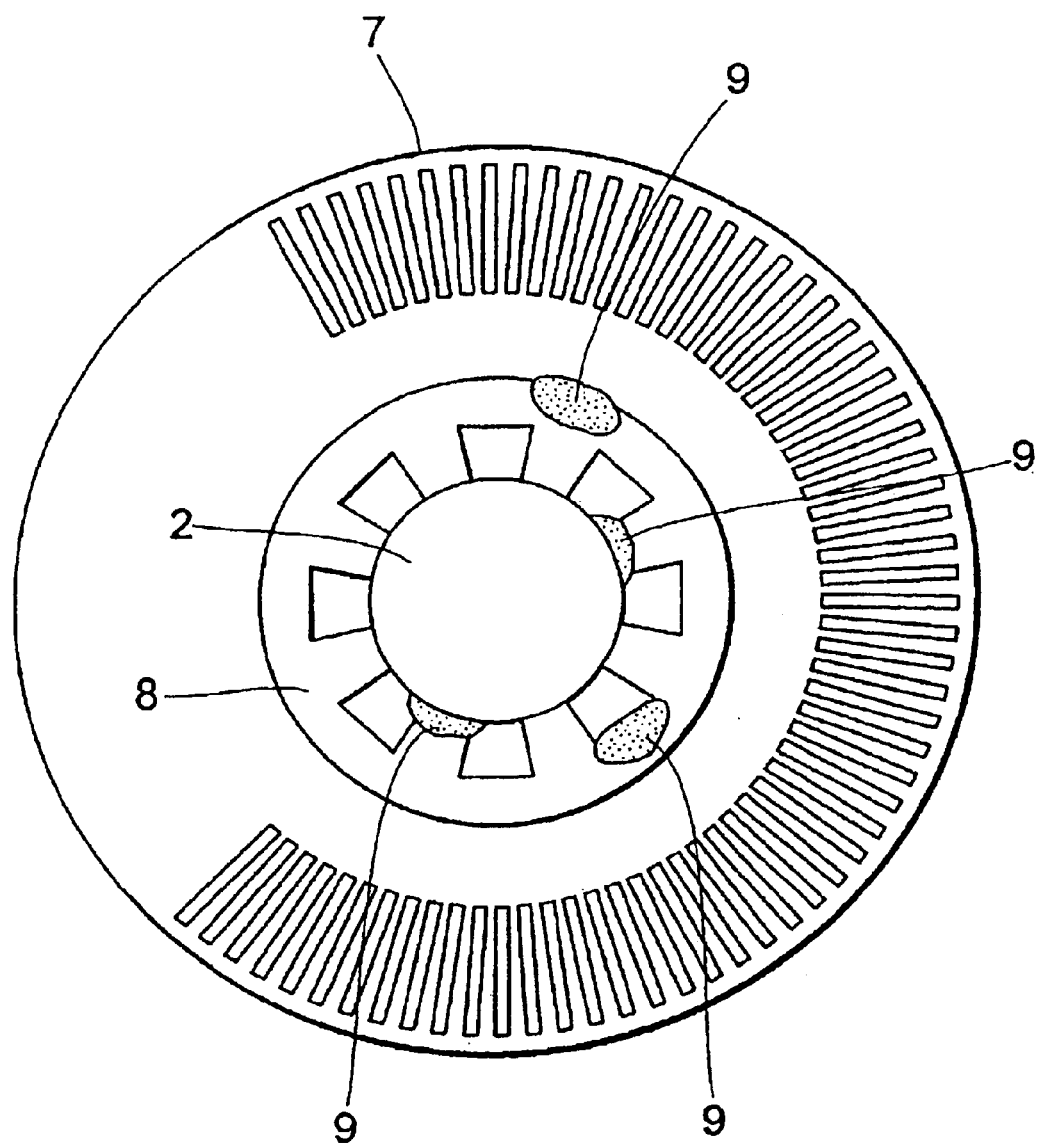
FIG. 12 is a fragmentary enlarged plan view of the example of the prior art.
Figure 13:
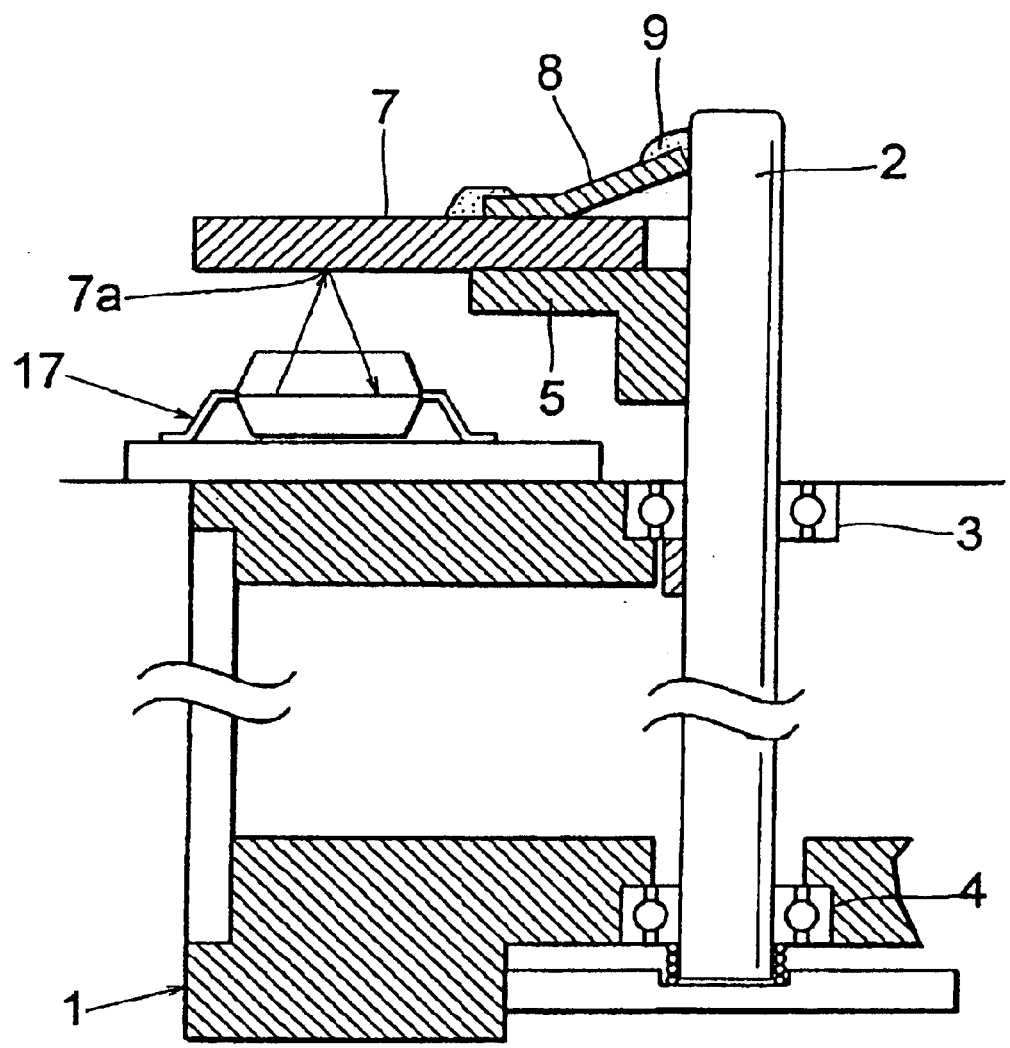
FIG. 13 is a fragmentary cross-sectional view of a reflecting type encoder according to the prior art.
Figure 14:
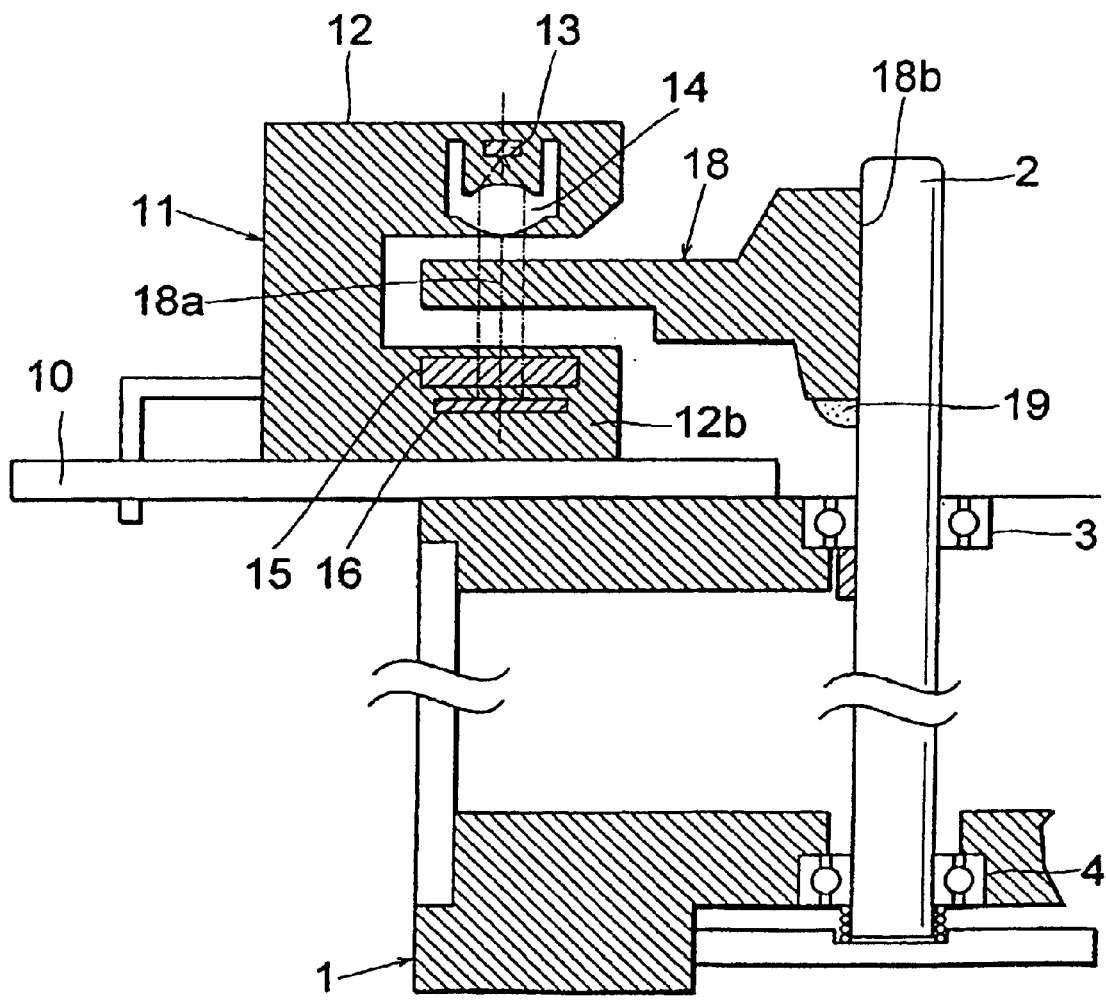
FIG. 14 is a fragmentary cross-sectional view of a transmitting type encoder having an integral rotary disc according to the prior art.

FIG. 10 is a cross-sectional view of the essential portions of a sixth embodiment, and a rotary disc 63 is fixed to the upper end surface of the rotary shaft 62 of a motor 61 by a washer 64 and a set screw 65. The upper end surface of the rotary shaft 62 is formed with a threaded hole 62a threadably engaged by the set screw 65.

The rotary disc 63 is provided with a disc-shaped fixed portion 63a fixed to the upper end surface of the rotary shaft 62, a cylindrical portion 63b extending downwardly from the outer peripheral edge of the fixed portion 63a, and a disc main body portion 63c extending horizontally outwardly from the lower portion of the cylindrical portion 63b. The interior of the cylindrical portion 63b is made into a fitting hole 63d in which the rotary shaft 62 is fitted, and the space between the outer peripheral surface of the rotary shaft 62 and the inner peripheral surface of the fitting hole 63d is a minute gap. The fixed portion 63a is formed with an insertion hole 63e in which the set screw 65 is inserted, and the scale portion 27 for detecting the rotation angle is disposed on the underside of the disc main body portion 63c. Again in this sixth embodiment, an effect similar to that of the first to third embodiments is obtained.

While in the embodiments described hitherto, description has been made of the rotary disc made of synthetic resin, the synthetic resin is not restrictive.

Also, while description has been made of embodiments in which the change in the encoder is set so as to be offset for any temperature change, the present invention is of course not restricted to completely offset the change in the encoder. If the distance between the scale portion and the sensor head is set so as to schematically satisfy the aforedescribed expressions, it will become to sufficiently increase reading accuracy in practical use.

As described above, in the rotation angle detecting apparatus according to the present invention, the relative position of the scale portion for detecting the rotation angle and the sensor head is determined on the basis of the coefficient of thermal expansion of the rotary disc, the coefficient of thermal expansion of the rotary shaft and the temperature characteristic factor of the sensor head and therefore, even if the environmental temperature changes, the optimum relative position of the scale portion for detecting the rotation angle and the sensor head can be maintained. Accordingly, the output signal can be stabilized to thereby reduce the detection error and moreover, the fixing strength of the rotary shaft and the rotary disc can be improved. Also, it becomes possible to enlarge the relative incorporation margin of the scale portion for detecting the rotation angle and the sensor head. Also, the usable temperature range can be enlarged and moreover, the high resolving power and highly accurate detection of the rotation angle can be realized.

Also, the rotary disc of the rotation angle detecting apparatus according to the present invention is formed of a synthetic resin material and has a fixed portion fixed to the rotary shaft of the motor of the rotation angle detecting apparatus, a cylindrical portion extending from the outer peripheral edge of the fixed portion in a direction along the axis of the rotary shaft, and a disc main body portion extending from the end portion of the cylindrical portion in a direction orthogonal to the axis of the rotary shaft and therefore, when the environmental temperature rises, chiefly the cylindrical portion can be expanded in a direction along the axis thereof to thereby offset the expansion in a direction along the axis of the rotary shaft.

What is claimed is:
1. A rotation angle detecting apparatus comprising:
 (1) a rotary disc provided with a scale portion for rotation angle detection;
 (2) rotary means for rotating said rotary disc held on a rotary shaft thereof; and
 (3) a sensor head for detecting the rotation angle from said rotary disc; wherein a distance between said rotary disc and said sensor head in an axial direction of the shaft is set on the basis of the coefficients of thermal expansion of said rotary shaft and said rotary disc and a change factor of a temperature characteristic of said sensor head.

2. A rotation angle detecting apparatus comprising;
 (1) a rotary disc having a scale portion for rotation angle detection;
 (2) a motor rotatably holding said rotary disc on a rotary shaft thereof; and
 (3) a sensor head for detecting the rotation angle from said rotary disc;
 wherein said rotary disc comprises
  a fixed portion fixed to the rotary shaft of the motor,
  a cylindrical portion extending from an outer peripheral edge of said fixed portion in a direction along an axis of said rotary shaft, and
  a disc main body portion extending from an end portion of said cylindrical portion in a direction orthogonal to the axis of said rotary shaft;
 wherein an amount of change of the length of said cylindrical portion in the axial direction of said rotary shaft due to a temperature change and an amount of change of the length of said rotary shaft in the axial direction thereof are opposite in direction to each other and substantially equal to each other.

3. A rotation angle detecting apparatus according to claim 2, wherein a material of the rotary disc includes synthetic resin.

4. A rotation angle detecting apparatus comprising:
 (1) a rotary disc having a scale portion for rotation angle detection;

(2) a motor rotatably holding said rotary disc on a rotary shaft thereof; and (3) a sensor head for detecting the rotation angle from said rotary disc;

wherein said rotary disc comprises
- a fixed portion fixed to the rotary shaft of the motor,
- a cylindrical portion extending from an outer peripheral edge of said fixed portion in a direction along an axis of said rotary shaft, and
- a disc main body portion extending from an end portion of said cylindrical portion in a direction orthogonal to the axis of said rotary shaft;

wherein the relative position of said sensor head and said scale portion is set along an axial direction of the shaft such that an amount of change of the length of said cylindrical portion in the axial direction of said rotary shaft due to a temperature change, an amount of change of the length of said rotary shaft in the axial direction thereof and a change in a characteristic of said sensor head due to temperature negate one another.

5. A rotation angle detecting apparatus according to claim 4, wherein the change in the characteristic of said sensor head due to temperature is a change in a position of a light condensing point.

6. A rotation angle detecting apparatus according to claim 4, wherein a material of the rotary disc includes synthetic resin.

7. A rotation angle detecting apparatus for use in rotation angle detection, comprising:

(1) a rotary disc having a scale portion for detecting a rotation angle;

(2) rotary means for rotating said rotary disc fixed on a rotary shaft extending from a mounting reference surface thereof, (3) a sensor head mounted on the mounting reference surface for detecting the rotation angle from said rotary disc;

wherein, among a coefficient of thermal expansion $\alpha 1$ of said rotary disc, a coefficient of thermal expansion $\alpha 2$ of said rotary shaft, temperature characteristic factor $\beta$ of said sensor head, a distance H from the mounting reference surface of said rotary means to a light condensing point of said sensor head in a direction parallel to the axis of said rotary shaft, a distance L from said mounting reference surface to a fixed point between said rotary shaft and said rotary disc in a direction parallel to the axis of said rotary shaft, the distance S from said fixed point to said scale portion for rotation angle detection with respect to the direction along the axis of said rotary shaft, and the amount of change $\Delta T$ of ambient temperature, a first relational expression $\beta \times H \times \Delta T = (\alpha 2 \times L + \alpha 1 \times S) \times \Delta T$ and a second relational expression $L = H + S$ are substantially satisfied.

8. A rotation angle detecting apparatus according to claim 7, wherein the amount of change of said distance H changing in conformity with said amount of change $\Delta T$ of temperature is $\Delta H$, and said temperature characteristic factor $\beta$ is $\Delta H/H$.

9. A rotation angle detecting apparatus according to claim 7, wherein said scale portion comprises one or more reflecting elements arranged circumferentially regularly.

10. A rotation angle detecting apparatus according to claim 7, wherein a material of the rotary disc includes synthetic resin.

* * * * *

UNITED STATES PATENT AND TRADEMARK OFFICE
CERTIFICATE OF CORRECTION

PATENT NO. : 6,901,682 B2
DATED : June 7, 2005
INVENTOR(S) : Masahiko Igaki

It is certified that error appears in the above-identified patent and that said Letters Patent is hereby corrected as shown below:

Column 10,
Line 6, add -- a -- before "temperature characteristic factor $\beta$ ..."

Signed and Sealed this

Ninth Day of August, 2005

JON W. DUDAS
*Director of the United States Patent and Trademark Office*